United States Patent [19]

Grochol et al.

[11] 3,927,165
[45] Dec. 16, 1975

[54] NON-CORROSIVE REGULAR PACKING MEMBER AND A METHOD OF MAKING SAME

[75] Inventors: Jan Grochol, Winterthur; Werner Meier, Elgg, both of Switzerland

[73] Assignee: Sulzer Brothers Limited, Winterthur, Switzerland

[22] Filed: May 16, 1974

[21] Appl. No.: 470,446

[30] Foreign Application Priority Data
May 23, 1973  Switzerland.......................... 7304/73

[52] U.S. Cl. .................... 264/129; 55/521; 55/524; 65/3; 261/DIG. 72; 264/257; 427/372; 428/182; 428/228; 428/289; 428/392
[51] Int. Cl.²......................... B29H 9/02; B32B 17/02
[58] Field of Search ....... 161/89, 93, 133, 135, 170, 161/DIG. 4; 264/58, 257, 280, 129, 134; 261/DIG. 72, 108, 112; 117/126 GF; 156/178, 181; 55/521, 524, 527, DIG. 16; 428/392, 182, 184; 65/3, 4

[56] References Cited
UNITED STATES PATENTS

| 2,839,424 | 6/1958 | Labino................................ 161/170 |
| 3,189,563 | 6/1965 | Havel............................ 117/126 GF |
| 3,220,915 | 11/1965 | Shannon ........................ 55/DIG. 16 |
| 3,372,051 | 3/1968 | Stalego ......................... 117/126 GF |
| 3,679,537 | 7/1972 | Huer et al............................. 161/93 |
| 3,801,419 | 4/1974 | Meek ................................... 161/133 |

*Primary Examiner*—George F. Lesmes
*Assistant Examiner*—Paul J. Thibodeau
*Attorney, Agent, or Firm*—Kenyon & Kenyon Reilly Carr & Chapin

[57] ABSTRACT

A non-self-supporting base material of glass fibers is first formed and then coated by an ionotropic sol to have a hard coating formed on the glass fibers. The coating is made of a bonding agent containing at least one glass-forming oxide selected from the compounds of silicon, aluminum, zirconium and titanium. The stiffened structure is useful in any shape for a regular packing such as in layer form, honeycomb and the like.

3 Claims, 6 Drawing Figures

NON-CORROSIVE REGULAR PACKING MEMBER AND A METHOD OF MAKING SAME

This invention relates to a non-corrosive regular packing member and to a method of making the same.

Heretofore, it has been known to make column components from materials such as metal alloys, porcelain, asbestos and plastics for material exchange columns such as are used for distillation, rectification, absorption, regeneration and extraction operations; for wetting and drying; for performing chemical reactions; and for heat exchangers which are used, for instance, in air conditioning to cool or heat one agent by means of a heat exchange agent. Generally, these column components are required to have very large surface areas, and depending on whether the surface areas are regular or irregular, the corresponding column component is known as either a regular packing or a statistical packing.

However, statistical packings are unsatisfactory for many processes, such as the rectification of temperature-sensitive substances, since the considerable pressure drop arising in such packings may lead to a high temperature at the bottom of the column and, hence, to decomposition of the treatment products. Low pressure drops are important too in absorption processes, for instance, in a waste air cleaningprocess, so as to bring about a considerable reduction in the power required to operate the fans for moving the waste air. Consequently, it is perferred in all such processes to use regular packings, for which the pressure drop is less than for statistical packings.

Generally, the regular packings which are the most common at the present time are prepared from a woven or knitted fabric of metal wires. Other known regular packings are devised from asbestos or plastics. The woven or knitted metal items are mostly prepared from narrow wires. Unfortunately, these wires which are usually made of steel, are not corrosion-resistant to a large number of substances which have to be treated.

Asbestos members can withstand a relatively large number of substances but must be of relatively large wall thickness, since asbestos is so brittle. The resulting regular packing elements are, therefore, heavy and the free space or gap volume for a given diameter is reduced, so that the pressure drop increases.

It has already been suggested to form layers of regular-packing members of asbestos paper with the layers being treated with a non-shrink synthetic resin such as epoxy or phenol resin. Unfortunately, resins of this kind can only withstand temperatures of, at most, approximately 100°C and are therefore of use for only a limited number of processes.

Plastics regular-packing members also have the disadvantage of being usable only at relatively low temperatures, and so their range of application is fairly narrow. These packing members also have the disadvantage that their pore wettability leads to poor liquid distribution, since pooling occurs, so that there is a reduction in the superficial area available for material for heat exchange.

In another known form of regular packing members which have satisfactory liquid distribution over the whole cross-section of a single member, the construction is in the form of fluted or corrugated strips of a knitted or woven fabric of textile or glass fibers, the dimensional stability of the articles being increased by the provision at intervals of metal wires. However, the stiffening metal wires are disadvantageous, since for manufacturing reasons the wires must be narrow and, thus are likely to be destroyed by corrosion.

Accordingly, it is an object of the invention to provide a regular packing member which is corrison resistant.

It is another object of the invention to form a regular packing member which is temperature resistant over a temperature range in which material exchange or heat exchange processes occur.

It is another object of the invention to provide a regular packing member which can be used for temperatures up to 300°C.

It is another object of the invention to provide a regular packing member which is wettable for treating organic and inorganic liquids.

Briefly, the invention provides a regular packing member having a non-self-supporting base material of glass fibers and a coating of a bonding agent containing at least one glass-forming ingredient on the fibers. The bonding agent serves to join the individual glass fibers together. The bonding of the glass fibers together serves to stiffen the base material so that the base material becomes dimensionally stable.

The glass-forming oxide is selected from compounds of silicon, aluminum, zirconium and titanium. The coated base material serves to form walls to define flow channels. For example, shaped layers of the base material can be placed together to form a packing member having a multitude of flow channels, e.g. arranged in a criss-crossing pattern.

The invention also provides a method of making a regular packing member comprising the steps of wetting a flat structure of glass fibers with an ionotropic sol and of thereafter drying the wetted structure at a temperature of 300°C or less to chemically bond a solid coating to the glass fibers and form a stiffened structure. The wetted structure is shaped prior to being dried into the stiffened structure in order to form the packing member.

The term "ionotropic sol" denotes a sol which consists of charged colloidal particles and which sol in the case of the invention contains glass-forming components which enter into a chemical compound with the glass fibers.

The term "non-self-supporting base material of the glass fibers" is intended to denote a woven fabric of glass fiber bunches or a knitted fabric or a fleece having open loops.

The regular packing member is not limited to any particular structure. For instance, the regular packing member may be in the form of fluted or corrugated layers which are brought together. A regular packing member can also, if required, have a honeycomb structure, the flow channel cross-sections being polygonal, e.g. square or hexagonal in shape. If required, the structure can take the form of a fluted or corrugated coiled strip.

A typical exemplary use of regular packing members made of glass fibers is in the rectification of temperature-sensitive high-boiling-point compounds containing chlorine or bromine. Because of a tendency to decompose, substances of this kind must be rectified in vacuo, and for this purpose it is preferred to use regular packings which are associated with a reduced pressure drop. The decomposition products of such compounds are highly corrosive and make it impossible to use stainless steel wires.

Another use is in the rectification of dicarboxylic acids wherein a severe corrosive action makes it necessary, for instance, to use titanium. Unfortunately, titanium is very costly, particularly because, in normal exchange processes, a large number of regular packing members which are of relatively large diameter have to be used. However, regular packing members according to the invention are much cheaper and are resistant to corrosion by dicarboxylic acids.

Another example is in the rectification of some organic products for which rectification is usually given at an elevated temperature of e.g. 150°C or more. In such cases, regular packing members made of plastics could not be used, nor could metal members, for in this case the treated products would decompose catalytically in contact with metals.

The invention allows the discrete glass fibers to be covered by a thin glassy layer which has been evolved from a colloidal solution. The layer bonds the discrete fibers together, the fiber structure being retained as such while most of the loops present before application of the sol remain open after treatment, thus ensuring a satisfactory material exchange between adjacent flow channels.

These and other objects and advantages of the invention will become more apparent from the following detailed description and appended claims taken in conjunction with the accompanying drawings in which:

Figure 3:
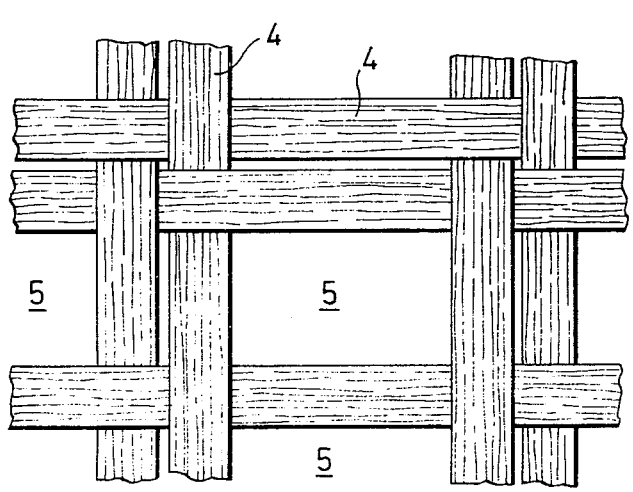
Figure 4:
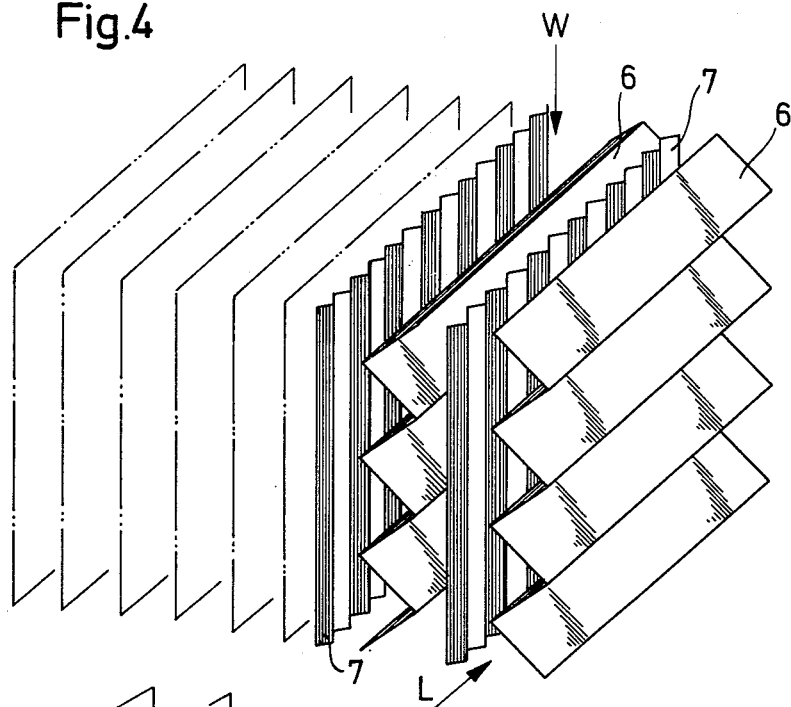
Figure 5:
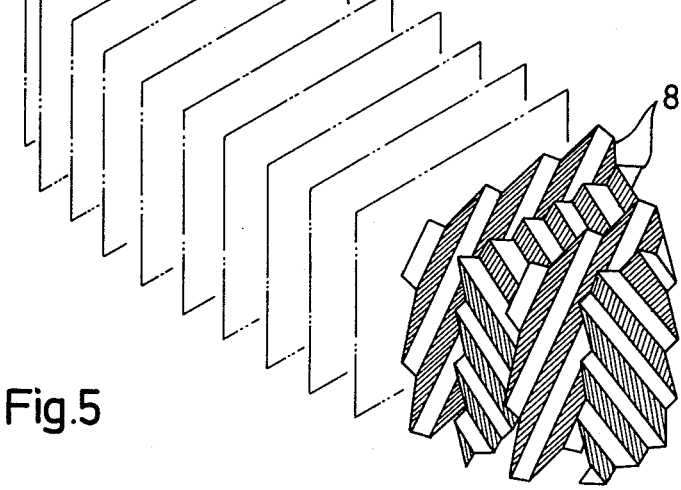

FIG. 3 diagrammatically illustrates part of a glass-fiber woven fabric which has been coated in accordance with the invention;

FIG. 4 diagrammatically illustrates a regular packing member according to the invention for use for a cross-current heat exchanger; and FIG. 5 diagrammatically illustrates a number of discrete layers of a regular packing member according to the invention for a crylindrical cross-section material exchange column.

Figure 1A:
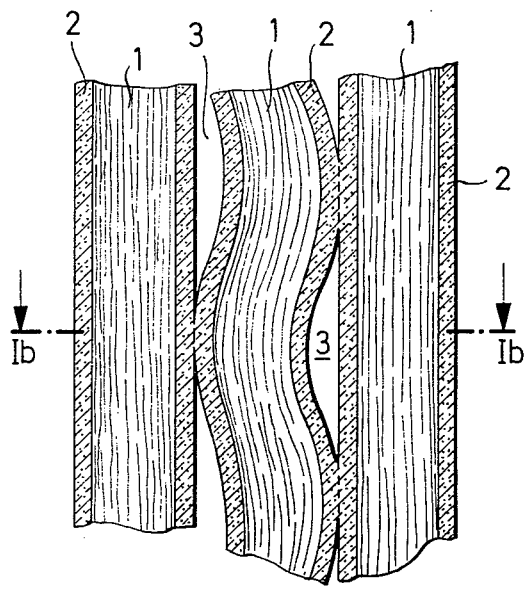
FIG. 1a illustrates a longitudinal sectional view of part of a fiber bunch or group which has been stiffened or reinforced in accordance with the invention.
Figure 1B:
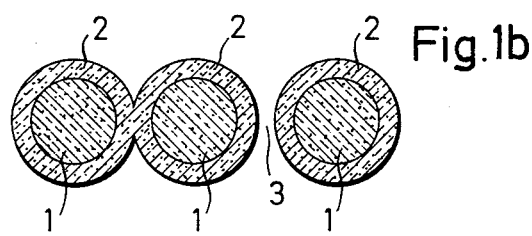
FIG. 1b illustrates a cross-sectional view taken on line Ib–Ib of FIG. 1.
Figure 2:
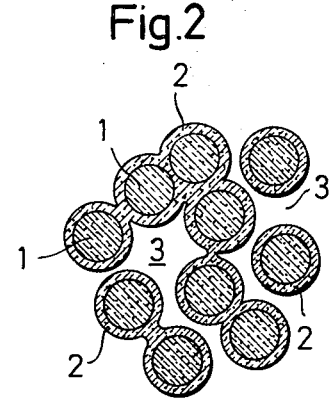
FIG. 2 illustrates a cross-sectional view similar to FIG. 1b, through a larger portion of a coated glass fiber bunch.

Referring to FIGS. 1a and 1b and 2, glass fibers 1 of a diameter e.g. of 5 and 12 microns ($\mu$) and forming part of a group or bunch are covered by a glass-like layer 2 which has bonded chemically with the glass fiber surfaces. The fibers 1, before being coated, form a non-self-supporting base material.

The coated glass fibers 1 have gaps 3 defined between various random fibers to ensure satisfactory capillary action within each individual bunch of glass fibers. This ensures that the liquids to be treated are distributed uniformly during a material or heat exchange process.

The coated glass fibers 1 also have junctions between adjacent glass fibers which are produced during coating. These junctions serve to stiffen the base material.

Referring to FIG. 3, bunches of glass fibers 4 forming the warp and weft yarns are woven into a fabric and thereafter coated. As shown, after coating of the fabric, open loops 5 remain so that the liquid to be treated in the material or heat exchange process can flow through the open loops 5. During use, liquid layers can arise on both sides of the loops 5 and are important in the exchange of material or heat. Liquid can, therefore, be conveyed from any layer of a regular packing member to the immediately adjacent layer.

Referring to FIG. 4, a regular packing member is made up of a plurality of discrete layers 6, 7, each of which is formed, as above, of a woven or knitted fabric or fleece of coated glass fibers. The layers 6, 7 have walls which define flow channels, each wall including a non-self-supporting base material of glass fibers and a coating of a bonding agent containing at least one glass-forming oxide selected from the compounds of silicon, aluminum, zirconium and titanium. The packing member is useable in a cross-current heat exchanger such as can be used with advantage in air conditioning. The discrete layers 6, 7 have horizontal and vertical flutings or corrugations respectively, the corrugations of adjacent layers having spot contact with one another and cooperating to include an angle of approximately 90°. Arrow W denotes the flow direction of the cooling water while L denotes the flow direction of the air for cooling, during operation of the system.

The regular packing member which is of square cross-section is installed in known manner in a chamber having provision for the supply and removal of air and water. The cross-section of a packing member can, of course, be e.g. circular.

Referring to FIG. 5, a packing is made up of coated layers 8 which form part of a regular packing member for a material exchange column, e.g. a rectification column, for countercurrent exchange between a liquid phase and a gas phase. The layers or strips 8 are shown in the sequence as they are placed seriatim one upon another, whereafter they are slide into the material exchange section of a cylindrical column. FIG. 5 makes clear the different layer size of the individual parts, such sizes increasing from the two outsides towards the center so that when the layers meet, the layers result in a cylindrical member. Only four of the individual layers are shown in detail, the remainder being shown diagrammatically.

As shown, the corrugations or the like of the adjacent layers 8 extend in such a way that the sides of the corrugations of any two adjacent layers intersect one another.

As previously mentioned, however, the regular packing members are not limited to the kind shown in FIGS. 4 and 5 but may also be of other shapes, e.g. of the kind having a honeycomb flow channel structure.

In order to make a regular packing member a flat structure of glass fiber bunches is wetted with an ionotropic sol and thereafter dried at a temperature of from room temperature to 300°C so that the glass fiber bunches are stiffened and strengthened, for example, into the form shown in part in FIG. 3 by the resultant glass-like coating. The flat structure may also be shaped before final drying into any suitable shape having walls which define discrete flow channels.

Two preparation examples will be described hereinafter for coating glass fiber woven fabrics for use as regular packing members.

PREPARATION EXAMPLES

Example 1

Treatment with the following sol:
20 weight parts Al $(NO_3)_3 \cdot 9H_2O$
400 weight parts alcohol 5 weight parts of lactic acid aluminum salt
100 weight parts of tetraethoxysilane (40% $SiO_2$)

The specimens become rigid within 40 seconds at 250°C. Where polar media are being treated, such as chlorobenzene, the two following after-treatments with after-drying are given after the treatment just described.

1st Aftertreatment - Wetting with sol of
5 weight parts zirconium acetyl acetonate
90 weight parts of ethanol
1 weight parts of a molar aqueous solution of Ti$(OH)_3$ F
30 weight parts tetraethoxysilane (40% $SiO_2$) Dry 2nd Aftertreatment
1% aqueous solution of N -$\beta$- (amino-ethyl)-$\gamma$-aminopropyl trimethoxysilane
Dry Example 2

Treatment of glass fiber woven fabric with the following sol:
6 weight parts Al $(NO_3)_3$ . 9 $H_2O$
500 weight parts alcohol
114 weight parts tetraethoxysilane
9 weight parts di-isopropyloxy-titanium-bis-acetylacetonate The specimens become rigid in 3 seconds at 230°C.

The invention thus provides a means of making a regular packing member of glass fibers which is non-corrosive and temperature-resistant at least up to 300°C. The packing member is also constructed so that capillary action is retained between the glass fibers to ensure a uniform liquid distribution in use.

The bonding agent is the coating which is chemically bonded to the base material of glass fibres and which simultaneously bonds at least a number of adjacent fibres together.

The glass-forming oxide has the elementary structure of glass and coating. The coating is formed by discharge of the colloidal particles of the ionotropic sol. It gives a gel and subsequently it polymerizes into an elementary glassy structure.

What is claimed is:

1. A method of making a regular packing member for material exchange columns and heat exchangers, the said regular packing member having walls defining flow channels therein, each said wall including a non-self-supporting base material of glass fibers, comprising the steps of wetting a flat structure of said glass fibers with a glass-forming ionotropic sol consisting of charged colloidal particles and containing at least one glass forming oxide selected from the compounds of silicon, aluminum, zirconium, and titanium which enters into a chemical compound with the glass fibers of the fabric layer, thereafter shaping and drying the wetted structure at a temperature of 300°C or less to form an irreversible stiffened packing member structure.

2. A method as set forth in claim 1 which further comprises the step of impregnating the stiffened packing member with a silicate-sol and thereafter drying the impregnated member.

3. A method of making a layer for a regular packing member comprising the steps of
obtaining a flat non-self-supporting layer of glass fiber fabric defining a plurality of open loops,
wetting the fabric layer with a glass-forming ionotropic sol consisting of charged colloidal particles and containing at least one glass forming oxide selected from the compounds of silicon, aluminum, zirconium, and titanium which enters into a chemical compound with the glass fibers of the fabric layer,
shaping the wetted fabric layer to form a plurality of corrugations therein to define discrete flow channels, and
thereafter drying the shaped fabric at a temperature below 300°C into a rigid structure.

* * * * *